United States Patent
Tanaka et al.

(10) Patent No.: US 11,565,580 B2
(45) Date of Patent: Jan. 31, 2023

(54) CONTROLLER FOR HYBRID VEHICLE

(71) Applicant: TOYOTA JIDOSHA KABUSHIKI KAISHA, Toyota (JP)

(72) Inventors: Shintaroh Tanaka, Seto (JP); Junichi Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 291 days.

(21) Appl. No.: 17/080,206

(22) Filed: Oct. 26, 2020

(65) Prior Publication Data

US 2021/0178884 A1    Jun. 17, 2021

(30) Foreign Application Priority Data

Dec. 11, 2019 (JP) .................................. 2019-223649

(51) Int. Cl.

| | |
|---|---|
| B60K 6/28 | (2007.10) |
| G07C 5/08 | (2006.01) |
| B60K 6/54 | (2007.10) |
| H02J 7/16 | (2006.01) |
| B60K 6/26 | (2007.10) |
| H02J 7/00 | (2006.01) |
| G07C 5/00 | (2006.01) |

(52) U.S. Cl.
CPC .................. *B60K 6/26* (2013.01); *B60K 6/28* (2013.01); *B60K 6/54* (2013.01); *G07C 5/008* (2013.01); *G07C 5/085* (2013.01); *G07C 5/0816* (2013.01); *H02J 7/0048* (2020.01); *H02J 7/16* (2013.01); *B60Y 2200/92* (2013.01); *B60Y 2300/91* (2013.01)

(58) Field of Classification Search
CPC ... B60K 6/26; B60K 6/28; B60K 6/54; G07C 5/008; G07C 5/0818; G07C 5/085; H02J 7/0048; B60Y 2200/92; B60Y 2300/91
USPC ....................................................... 701/102
See application file for complete search history.

(56) References Cited

FOREIGN PATENT DOCUMENTS

| | | | |
|---|---|---|---|
| JP | 2010-111291 A | | 5/2010 |
| JP | 2010144699 A | * | 7/2010 |

* cited by examiner

*Primary Examiner* — Mahmoud Gimie
(74) *Attorney, Agent, or Firm* — Oliff PLC (57) ABSTRACT

A controller for a hybrid vehicle performs charging control when a shift range of the hybrid vehicle is a first range, and does not perform the charging control when the shift range of the hybrid vehicle is a second range, the charging control being control of charging a power storage device with electric power generated by a generator driven by an engine. The controller records diagnosis information when an SOC of the power storage device is equal to or lower than a first threshold value and the shift range of the hybrid vehicle is the first range, and does not record the diagnosis information when the SOC of the power storage device is equal to or lower than the first threshold value and the shift range of the hybrid vehicle is the second range.

10 Claims, 8 Drawing Sheets

CONTROLLER FOR HYBRID VEHICLE

This nonprovisional application is based on Japanese Patent Application No. 2019-223649 filed on Dec. 11, 2019 with the Japan Patent Office, the entire contents of which are hereby incorporated by reference.

BACKGROUND

Field

The present disclosure relates to a controller for a hybrid vehicle.

Description of the Background Art

Japanese Patent Laying-Open No. 2010-111291 discloses a technique for detecting an abnormality in engine output (and, in turn, an abnormality in an engine) using a detection value from an engine speed sensor.

SUMMARY

In the method described in Japanese Patent Laying-Open No. 2010-111291, calculation involved with the detection of an engine abnormality tends to be complicated. It is therefore contemplated, in a hybrid vehicle in which electric power generated by a generator driven by an engine can be supplied to a power storage device, to employ a method for diagnosing an abnormality in the hybrid vehicle by determining the occurrence of an abnormality in at least one of the engine and the generator when a state of charge (SOC) of the power storage device becomes equal to or lower than a prescribed value. According to such a method, abnormalities in the engine and the generator can be more readily detected. In a hybrid vehicle equipped with an electronic control unit (ECU) having the on-board diagnostics (OBD) function, when an abnormality is detected with the method described above, diagnosis information indicating the occurrence of an abnormality in at least one of an engine and a generator is recorded in a storage. The diagnosis information indicating the occurrence of an abnormality in at least one of an engine and a generator is hereinafter also referred to as "E-diagnostic information." Electric power generation using engine output in a hybrid vehicle is also referred to as "engine electric power generation."

Depending on the state of a hybrid vehicle, however, it may be difficult to perform the engine electric power generation. For example, depending on the shift range, the engine electric power generation may not be performed even if an engine and a generator are normally driven. When the vehicle is left in a shift range where the engine electric power generation is not performed, the SOC of a power storage device may become equal to or lower than a prescribed value despite the absence of abnormalities in the engine and the generator, resulting in the E-diagnostic information being erroneously recorded.

The present disclosure was made to solve the problem above, and an object thereof is to provide a controller for a hybrid vehicle in which erroneous recording of diagnosis information can be suppressed.

A controller for a hybrid vehicle according to the present disclosure controls a hybrid vehicle described below. The hybrid vehicle includes: an engine; a generator that is driven by the engine; a power storage device chargeable with electric power generated by the generator; and a shift device capable of switching between a plurality of shift ranges in response to shifting operation by a user. The plurality of shift ranges include a first range and a second range. The controller includes a charging control unit and a first record unit described below. The charging control unit performs charging control when a shift range of the hybrid vehicle is the first range, and does not perform the charging control when the shift range of the hybrid vehicle is the second range, the charging control being control of charging the power storage device with electric power generated by the generator driven by the engine. The first record unit records diagnosis information when an SOC of the power storage device is equal to or lower than a first threshold value and the shift range of the hybrid vehicle is the first range, and does not record the diagnosis information when the SOC of the power storage device is equal to or lower than the first threshold value and the shift range of the hybrid vehicle is the second range, the diagnosis information indicating occurrence of an abnormality in at least one of the engine and the generator.

In the controller, when the shift range is the first range, the power storage device is charged by engine electric power generation (that is, electric power generation using engine output). In the controller, when the shift range is the first range, and the SOC of the power storage device becomes equal to or lower than the first threshold value, E-diagnostic information (that is, diagnosis information indicating the occurrence of an abnormality in at least one of the engine and the generator) is recorded by the first record unit. In this manner, according to the configuration, abnormalities in the engine and the generator can be detected based on the SOC of the power storage device.

In the hybrid vehicle, a shift range where the engine electric power generation is not performed corresponds to the second range. When the shift range is the second range, the first record unit does not record the E-diagnostic information even if the SOC of the power storage device becomes equal to or lower than the first threshold value. In the controller, therefore, even if the vehicle is left in the shift range where the engine electric power generation is not performed, the possibility of the E-diagnostic information being erroneously recorded is low. In this manner, according to the controller, the erroneous recording of the E-diagnostic information can be suppressed.

Note that the state of charge (SOC) indicates a remaining amount of power storage and is, for example, a ratio of a current amount of power storage to an amount of power storage in a fully charged state expressed in 0 to 100%. That "the SOC of the power storage device becomes equal to or lower than a prescribed value (for example, the first threshold value described above or a second threshold value which will be described later)" means that the SOC of the power storage device transitions from a state in which it is higher than the prescribed value to a state in which it is equal to or lower than the prescribed value. That the SOC of the power storage device becomes equal to or lower than the first threshold value and the second threshold value is hereinafter also referred to as a "first SOC decrease" and a "second SOC decrease," respectively.

The first range may include a parking range. The second range may include a neutral range.

For example, a hybrid vehicle is known in which a generator is not driven by an engine in a neutral range (which is hereinafter also referred to as an "N range"). The generator is not driven by the engine in the N range because, for example, repeated stopping and starting of the engine and repeated increasing and decreasing of engine rotation speed for charging control in the N range may cause a user to feel uncomfortable. In the configuration, the second range includes the neutral range. Therefore, even if the SOC of the power storage device becomes equal to or lower than the first threshold value because the vehicle has been left in the N range as the shift range, the E-diagnostic information is not recorded by the first record unit. In the controller having the configuration, therefore, even if the vehicle is left in the N range, the possibility of the E-diagnostic information being erroneously recorded is low.

In the configuration, the first range includes the parking range (which is hereinafter also referred to as a "P range"). Therefore, the user can set the shift range to the P range while the vehicle is stopped, for example, to perform the engine electric power generation so as to prevent an excessive decrease in the SOC of the power storage device.

The second range may be only the neutral range, and the first range may be a non-neutral range (that is, all shift ranges other than the neutral range).

The controller may further include a second record unit that records history information indicating a decrease in the SOC of the power storage device when the SOC of the power storage device becomes equal to or lower than the first threshold value.

For example, when the vehicle is left in the second range, the SOC of the power storage device may become equal to or lower than the first threshold value. When the SOC of the power storage device decreases excessively (for example, falls below a guaranteed operating range), deterioration of the power storage device tends to be accelerated. In the configuration, the first SOC decrease (that is, that the SOC of the power storage device becomes equal to or lower than the first threshold value) is recorded as the history information. Such history information is useful, for example, for knowing the state of the power storage device, and for preventing the deterioration of the power storage device. In addition, because it is believed that a frequent occurrence of the first SOC decrease is mainly caused by the user's driving (in particular, shifting operation), the degree of the user's driving skills can also be estimated from the history information.

The controller may transmit the history information recorded by the second record unit to an external server (that is, a server provided outside the vehicle) that collects information on each vehicle. The external server can use the history information on each vehicle for service to the user of each vehicle.

The controller may further include a discharging control unit that stops discharging of the power storage device by disconnecting a current path of the power storage device when the SOC of the power storage device becomes equal to or lower than the first threshold value. According to such a configuration, discharging of the power storage device is forcibly stopped when the SOC of the power storage device becomes equal to or lower than the first threshold value. Therefore, an excessive decrease in the SOC of the power storage device is suppressed.

The controller may include the second record unit and the discharging control unit described above, and when a frequency with which the SOC of the power storage device becomes equal to or lower than the first threshold value, indicated by the history information (that is, the history information recorded by the second record unit), exceeds a prescribed frequency, the controller may make a transition to an advice mode in which advice for preventing the SOC of the power storage device from becoming equal to or lower than the first threshold value is given to the user.

When the first SOC decrease occurs frequently, the user is likely to have poor driving skills. In the configuration, since discharging of the power storage device is forcibly stopped when the SOC of the power storage device becomes equal to or lower than the first threshold value, an excessive decrease in the SOC of the power storage device is suppressed even if the user has poor driving skills. In addition, the user of the vehicle in which the first SOC decrease occurs frequently can receive advice for avoiding the first SOC decrease (for example, advice about timing to switch between the first range and the second range) in the advice mode.

In the advice mode, the controller may communicate with outside and deliver advice via remote service to the user. In such a configuration, the use of the remote service allows providing advice with flexibility depending on the user.

The controller may further include a first notification unit that provides a notification to the user when the SOC of the power storage device becomes equal to or lower than the first threshold value.

The notification from the first notification unit is hereinafter also referred to as a "first notification." By making the first notification when the first SOC decrease occurs, a reoccurrence of the first SOC decrease can be suppressed. The first notification may be a message notifying the user that the SOC of the power storage device has reached a lower limit value.

The controller may further include a second notification unit that provides a notification to the user when the SOC of the power storage device becomes equal to or lower than a second threshold value higher than the first threshold value.

The notification from the second notification unit is hereinafter also referred to as a "second notification." By making the second notification when the second SOC decrease (that is, that the SOC of the power storage device becomes equal to or lower than the second threshold value) occurs, the occurrence of the first SOC decrease can be suppressed. The second notification may be a message notifying the user that the SOC of the power storage device is about to reach the lower limit value, or a message prompting the user to set the shift range to the first range.

The controller may further include a third notification unit that notifies, during a period from recording of the diagnosis information by the first record unit to erasing of the diagnosis information, the user of occurrence of an abnormality in the hybrid vehicle. The period from the recording of the diagnosis information by the first record unit to the erasing of the diagnosis information is hereinafter also referred to as an "abnormality period."

The notification from the third notification unit is hereinafter also referred to as a "third notification." By making the third notification during the abnormality period, the user can recognize that an abnormality has occurred in the hybrid vehicle, and repair (or request repair of) the hybrid vehicle. The third notification may be provided continuously during the abnormality period, or may be provided at prescribed timing (for example, at start-up of the vehicle system) during the abnormality period. The third notification may be provided by illumination of a malfunction indicator lamp (MIL).

The first to third notifications may be provided with any method. The notifications may be provided to the user by representation (for example, representation of characters or images) on a display, or may be provided to the user by sound (including voice) through a speaker, or may be provided by illumination (including blinking) of a prescribed lamp.

The controller may further include an erase unit that erases the diagnosis information recorded by the first record unit when a prescribed erase requirement is met after the diagnosis information is recorded by the first record unit, the prescribed erase requirement indicating normal operation of the engine and the generator.

According to any of the controllers for a hybrid vehicle described above, the possibility of erroneous recording of the E-diagnostic information is low. It is difficult, however, to completely eliminate the possibility of erroneous recording of the E-diagnostic information. According to the configuration, when the E-diagnostic information is erroneously recorded, the user can erase the E-diagnostic information by meeting the prescribed erase requirement. Note that because it takes time to meet the erase requirement in order to erase the E-diagnostic information, erroneous recording of the E-diagnostic information is not preferable in the configuration as well.

The generator may be a motor generator that allows the hybrid vehicle to travel with electric power stored in the power storage device.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described in detail with reference to the drawings. The same or corresponding elements in the drawings have the same reference characters allotted and description thereof will not be repeated.

Figure 1:
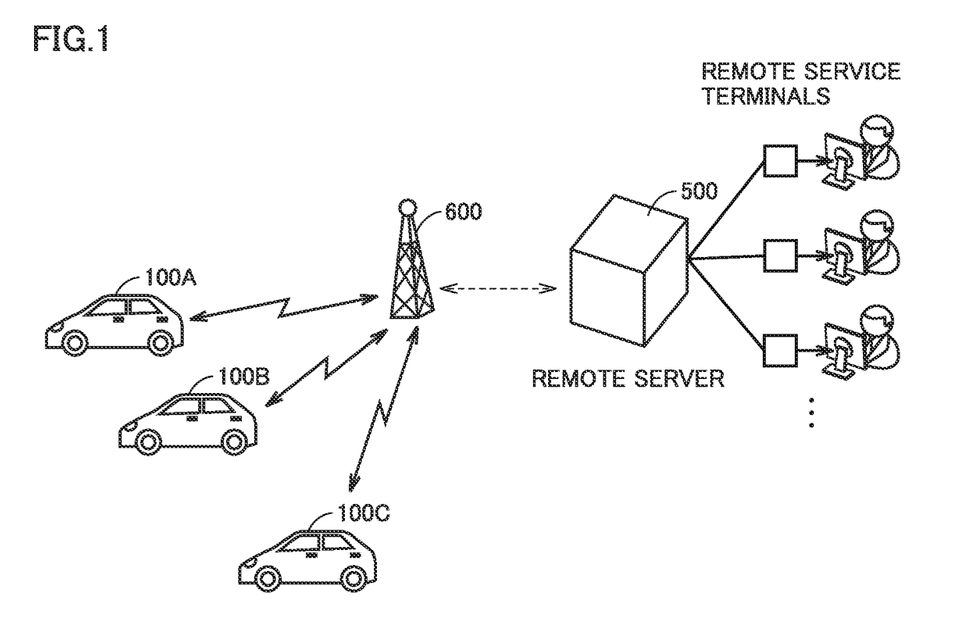
FIG. 1 shows an overview of a vehicle management system according to an embodiment of the present disclosure.

FIG. 1 shows an overview of a vehicle management system according to this embodiment. Referring to FIG. 1, the vehicle management system includes vehicles 100A to 100C, a remote server 500, and a base station 600. Remote server 500 is connected to a plurality of remote service terminals. An operator that provides remote service is assigned to each remote service terminal. The remote service is service of remotely providing operational support to each vehicle by the operator. Base station 600 relays communication between each of vehicles 100A to 100C and remote server 500. Although FIG. 1 shows only one base station 600, the vehicle management system includes a plurality of base stations. Each of vehicles 100A to 100C wirelessly communicates with remote server 500 through a mobile communication network (telematics) formed by the plurality of base stations (including base station 600). Information (including a communication address) on each of vehicles 100A to 100C is registered in remote server 500 in advance.

Although FIG. 1 shows three vehicles (that is, vehicles 100A to 100C), any number of vehicles may be included in the vehicle management system, and the number may be set to ten or more or one hundred or more. Each vehicle included in the vehicle management system may be a personally owned vehicle (POV) or a vehicle managed by a mobility as a service (MaaS) entity. Although the plurality of vehicles in the vehicle management system may be different from one another in configuration, they are identical in configuration in this embodiment. Each of the plurality of vehicles included in the vehicle management system is hereinafter denoted as a "vehicle 100," unless they are described as being distinguished from one another.

Figure 2:
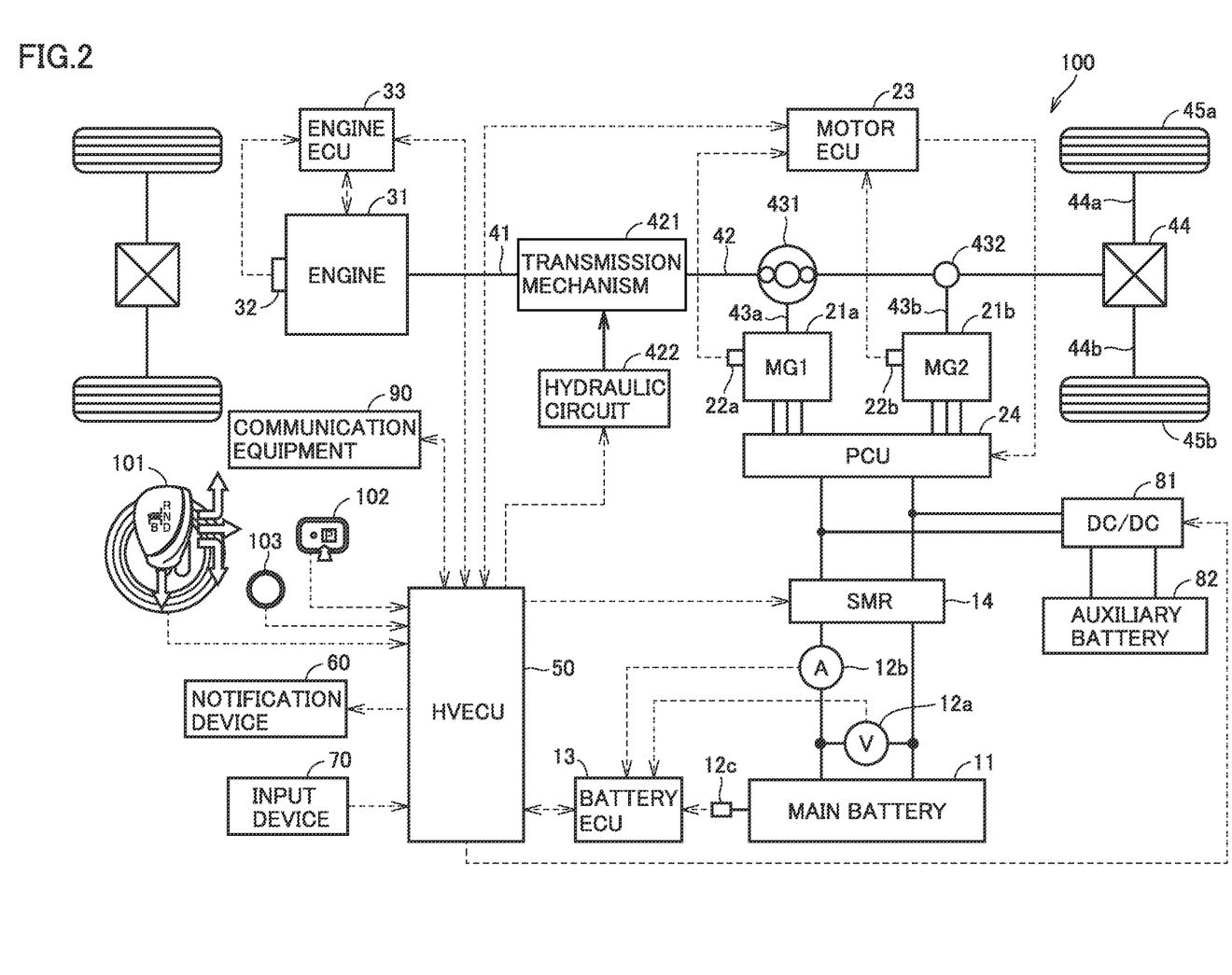
FIG. 2 shows a configuration of a hybrid vehicle according to the embodiment of the present disclosure.

FIG. 2 shows a configuration of vehicle 100. Referring to FIG. 2, vehicle 100 is a hybrid vehicle. Although a four-wheel vehicle of front-wheel-drive system (more specifically, a hybrid vehicle) is assumed in this embodiment, the number of wheels and the drive system may be changed as appropriate. For example, a four-wheel-drive system may be employed.

Vehicle 100 includes a main battery 11, a voltage sensor 12a, a current sensor 12b, a temperature sensor 12c, a battery ECU 13, a system main relay (SMR) 14, a first motor generator 21a (which is hereinafter denoted as "MG 21a"), a second motor generator 21b (which is hereinafter denoted as "MG 21b"), a motor ECU 23, a power control unit (PCU) 24, an engine 31, an engine ECU 33, a transmission mechanism 421, a hydraulic circuit 422, and an HVECU 50.

Main battery 11 includes a rechargeable secondary battery. Main battery 11 supplies electric power to PCU 24 (and, in turn, MGs 21a and 21b serving as traveling motors). In this embodiment, a battery assembly including a plurality of lithium-ion batteries electrically connected to one another is adopted as main battery 11. Each secondary battery forming the battery assembly is also referred to as a "cell." The secondary battery included in main battery 11 is not limited to the lithium-ion battery, and may be another secondary battery (for example, a nickel-metal hydride battery). A liquid secondary battery may be adopted, or an all-solid secondary battery may be adopted, as the secondary battery.

Voltage sensor 12a detects a voltage of each cell of main battery 11. Current sensor 12b detects a current flowing through main battery 11. Temperature sensor 12c detects a temperature of each cell of main battery 11. Each sensor outputs a result of the detection to battery ECU 13. Current sensor 12b is provided in a current path of main battery 11. In this embodiment, one voltage sensor 12a and one temperature sensor 12c are provided for each cell. Without being limited as such, one voltage sensor 12a and one temperature sensor 12c may be provided for every plurality of cells, or only one voltage sensor 12a and only one temperature sensor 12c may be provided for one battery assembly. Voltage sensor 12a, current sensor 12b and temperature sensor 12c are hereinafter collectively referred to as a "battery sensor." The battery sensor may be a battery management system (BMS) having a state-of-charge (SOC) estimating function, a state-of-health (SOH) estimating function, a cell voltage equalizing function, a diagnosis function, and a communication function, in addition to the sensor functions described above.

SMR 14 switches between connection and disconnection of a current path connecting PCU 24 to main battery 11. For example, an electromagnetic mechanical relay can be adopted as SMR 14. Main battery 11 is connected to PCU 24 with SMR 14 being interposed. When SMR 14 is closed (connected), electric power can be supplied and received between main battery 11 and PCU 24. When SMR 14 is opened (disconnected), on the other hand, the current path connecting main battery 11 to PCU 24 is disconnected. SMR 14 is controlled by HVECU 50. SMR 14 is closed when vehicle 100 travels, for example.

Each of MGs 21a and 21b is a motor generator that combines the function of a motor that outputs torque by being supplied with driving electric power and the function of a generator that generates electric power by being supplied with torque. An AC motor (for example, a permanent magnet type synchronous motor or an induction motor) is used as each of MGs 21a and 21b. Each of MGs 21a and 21b is electrically connected to main battery 11 with PCU 24 being interposed. MG 21a and MG 21b have rotor shafts 43a and 43b, respectively. Rotor shafts 43a and 43b correspond to rotation shafts of MG 21a and MG 21b, respectively.

Vehicle 100 further includes a single pinion type planetary gear 431. An output shaft 41 of engine 31 is coupled to planetary gear 431 with transmission mechanism 421 being interposed. Engine 31 is, for example, a spark ignition type internal combustion engine including a plurality of cylinders (for example, four cylinders). Engine 31 generates motive power by burning fuel (for example, gasoline) in each cylinder, and rotates a crankshaft (not shown) common to all cylinders by the generated motive power. The crankshaft of engine 31 is connected to output shaft 41 with a not-shown torsional damper being interposed. The rotation of the crankshaft also causes rotation of output shaft 41. Engine 31 is not limited to a gasoline engine, and may be a diesel engine.

Figure 3:
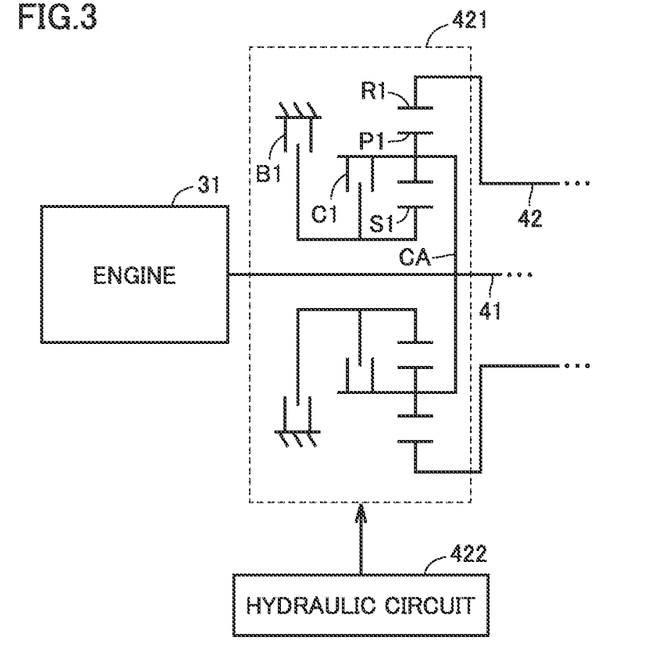
FIG. 3 shows an example configuration of a transmission mechanism shown in FIG. 2.

FIG. 3 shows an example configuration of transmission mechanism 421. Transmission mechanism 421 includes a planetary gear mechanism having a sun gear S1, a pinion gear P1, a ring gear R1, and a carrier CA. Output shaft 41 of engine 31 corresponds to an input shaft of transmission mechanism 421, and is coupled to carrier CA (input element) of the planetary gear mechanism. An output shaft 42 of transmission mechanism 421 is coupled to ring gear R1 (output element) of the planetary gear mechanism. Transmission mechanism 421 further includes a clutch C1 and a brake B1. Clutch C1 is a hydraulic friction engagement element that can couple sun gear S1 and carrier CA. When clutch C1 is engaged, sun gear S1 and carrier CA are coupled to each other and rotate together. When clutch C1 is disengaged (that is, released), sun gear S1 and carrier CA are decoupled from each other and do not interlock with each other. Brake B1 is a hydraulic friction engagement element that can restrict (lock) the rotation of sun gear S1. When brake B1 is engaged, sun gear S1 is fixed to a case, which restricts the rotation of sun gear S1. When brake B1 is disengaged (that is, released), sun gear S1 is detached from the case, which permits the rotation of sun gear S1.

Transmission mechanism 421 changes a gear ratio (that is, a ratio of the rotation speed of the input shaft of transmission mechanism 421 to the rotation speed of output shaft 42 of transmission mechanism 421) in accordance with the combination of engagement and release of clutch C1 and brake B1. The gear ratio can be expressed by an equation such as "gear ratio=rotation speed of carrier CA/rotation speed of ring gear R1."

When clutch C1 is engaged and brake B1 is released, for example, a low gear stage with a gear ratio of 1.0 (that is, a direct drive state) is created. When clutch C1 is released and brake B1 is engaged, a high gear stage with a gear ratio of less than 1.0 (that is, an overdrive state) is created. The direct drive state and the overdrive state each correspond to a non-neutral state (that is, a state where motive power is transmitted). In the non-neutral state, motive power that is output from engine 31 (that is, motive power that is input to transmission mechanism 421) is transmitted to output shaft 42 of transmission mechanism 421.

When clutch C1 and brake B1 are both released, on the other hand, carrier CA is capable of idling. Such a state of transmission mechanism 421 corresponds to a neutral state (that is, a state where the transmission of motive power is cut off). In the neutral state, motive power that is output from engine 31 (that is, motive power that is input to transmission mechanism 421) is not transmitted to output shaft 42 of transmission mechanism 421.

Note that when clutch C1 is engaged and brake B1 is engaged, the rotation of sun gear S1 and carrier CA is restricted, which also restricts the rotation of ring gear R1.

Hydraulic circuit 422 adjusts, in accordance with a command from HVECU 50, a hydraulic pressure supplied to each of clutch C1 and brake B1. HVECU 50 controls hydraulic circuit 422 to switch between engagement and release of each of clutch C1 and brake B1. Although details will be described later, HVECU 50 controls hydraulic circuit 422 in accordance with a shift range, for example.

Referring back to FIG. 2, output shaft 42 of transmission mechanism 421 and rotor shaft 43a of MG 21a are each coupled to planetary gear 431. Planetary gear 431 has three rotation elements, that is, an input element, an output element, and a reaction force element. More specifically, planetary gear 431 has a sun gear, a ring gear arranged coaxially with the sun gear, a pinion gear that meshes with the sun gear and the ring gear, and a carrier that holds the pinion gear in a manner that allows rotation and revolution of the pinion gear. The carrier corresponds to the input element, the ring gear corresponds to the output element, and the sun gear corresponds to the reaction force element.

Output shaft 42 of transmission mechanism 421 is coupled to the carrier of planetary gear 431. Rotor shaft 43a of MG 21a is coupled to the sun of planetary gear 431. Torque is input to the carrier of planetary gear 431 through output shaft 42 of transmission mechanism 421. When transmission mechanism 421 is in the non-neutral state, torque that is output from engine 31 is split and transmitted to the sun gear (and, in turn, MG 21a) and the ring gear by planetary gear 431. When the torque that is output from engine 31 is output to the ring gear, reaction torque by MG 21a acts on the sun gear.

Planetary gear 431 and MG 21b are configured such that motive power that is output from planetary gear 431 (that is, motive power that is output to the ring gear) and motive power that is output from MG 21b (that is, motive power that is output to rotor shaft 43b) are combined and transmitted to driving wheels 45a and 45b. More specifically, an output gear (not shown) that meshes with a driven gear 432 is mounted on the ring gear of planetary gear 431. A drive gear (not shown) mounted on rotor shaft 43b of MG 21b also meshes with driven gear 432. Driven gear 432 serves to combine torque that is output to rotor shaft 43*b* by MG 21*b* and torque that is output from the ring gear of planetary gear 431. The driving torque thus combined is transmitted to a differential gear 44, and is further transmitted to driving wheels 45*a* and 45*b* through drive shafts 44*a* and 44*b* extending laterally from differential gear 44.

MGs 21*a* and 21*b* are provided with motor sensors 22*a* and 22*b* that detect states (for example, a current, a voltage, a temperature, and a rotation speed) of MGs 21*a* and 21*b*, respectively. Motor sensors 22*a* and 22*b* each output a result of the detection to motor ECU 23. Engine 31 is provided with an engine sensor 32 that detects a state (for example, an intake air volume, an intake air pressure, an intake air temperature, an exhaust air pressure, an exhaust air temperature, a catalyst temperature, a temperature of cooling water for engine, and a rotation speed) of engine 31. Engine sensor 32 outputs a result of the detection to engine ECU 33. HVECU 50 receives, as needed, detection values of motor sensors 22*a*, 22*b* and engine sensor 32 from motor ECU 23 and engine ECU 33. HVECU 50 also receives, as needed, detection values of the battery sensors (that is, voltage sensor 12*a*, current sensor 12*b* and temperature sensor 12*c*) from battery ECU 13. Although not shown, other sensors (for example, a vehicle speed sensor, a fuel gauge, an odometer, an accelerator pedal position sensor, an atmospheric pressure sensor, and an outdoor air temperature sensor) are also mounted on vehicle 100. HVECU 50 can know information on vehicle 100 based on the outputs from the various sensors mounted on vehicle 100 (vehicle-mounted sensors).

HVECU 50 outputs a command for controlling engine 31 (control command) to engine ECU 33. Engine ECU 33 controls various actuators (for example, a throttle valve, an ignitor, and an injector which are not shown) of engine 31 in accordance with the command from HVECU 50. HVECU 50 can perform engine control through engine ECU 33.

HVECU 50 outputs a command for controlling each of MG 21*a* and MG 21*b* (control command) to motor ECU 23. Motor ECU 23 generates, in accordance with the command from HVECU 50, a current signal (for example, a signal indicating the magnitude and frequency of current) corresponding to a target torque of each of MG 21*a* and MG 21*b*, and outputs the generated current signal to PCU 24. HVECU 50 can perform motor control through motor ECU 23.

PCU 24 includes, for example, two inverters provided to correspond to MGs 21*a* and 21*b*, and a converter arranged between each inverter and main battery 11 (neither shown). PCU 24 supplies electric power stored in main battery 11 to each of MG 21*a* and MG 21*b*, and supplies electric power generated by each of MG 21*a* and MG 21*b* to main battery 11. PCU 24 can separately control the states of MG 21*a* and MG 21*b*, and can, for example, bring MG 21*a* into a regenerative state (that is, an electric power generation state) while bringing MG 21*b* into a power running state. PCU 24 can supply electric power generated by one of MG 21*a* and MG 21*b* to the other. MG 21*a* and MG 21*b* can supply and receive electric power between each other.

MG 21*a* functions as a generator that is driven by engine 31. MG 21*a* performs engine electric power generation (that is, electric power generation using motive power that is output from engine 31). HVECU 50 performs control of charging main battery 11 with electric power generated by the engine electric power generation, so as to prevent an excessive decrease in the SOC of main battery 11. The control of charging main battery 11 with electric power generated by the engine electric power generation is hereinafter also referred to as "E-charging control". Details of the E-charging control according to this embodiment will be described later (see FIG. 5).

Vehicle 100 performs HV travel and EV travel. The HV travel is travel performed by engine 31 and MG 21*b* while a driving force for traveling is generated by engine 31. The EV travel is travel performed by MG 21*b* with engine 31 stopped. When engine 31 is stopped, the combustion in each cylinder does not takes place. When the combustion in each cylinder is stopped, combustion energy (and, in turn, the driving force for traveling) is not generated in engine 31. HVECU 50 switches between the EV travel and the HV travel depending on the conditions.

Figure 4:
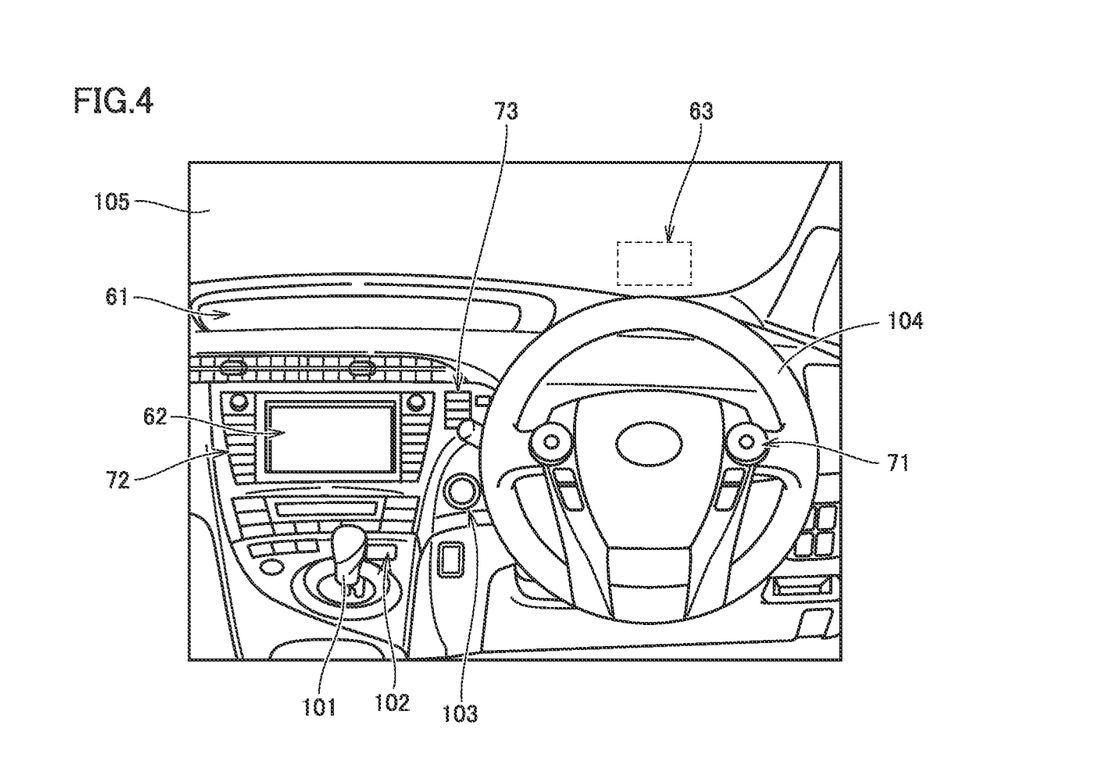
FIG. 4 illustrates a notification device and an input device shown in FIG. 2.

Vehicle 100 further includes a notification device 60 and an input device 70. Notification device 60 provides a notification to a user of vehicle 100 (for example, a driver and/or a passenger of vehicle 100) when a request is given from HVECU 50. Input device 70 is a device that accepts an input from the user. Input device 70 is operated by the user and outputs a signal corresponding to the operation by the user to HVECU 50. FIG. 4 illustrates notification device 60 and input device 70.

Referring to FIG. 4 together with FIG. 2, a shift lever 101, a P position switch 102, a power switch 103, a steering wheel 104, a windshield 105, a meter panel 61, and a head up display 63 are provided in the vicinity of a driver's seat in vehicle 100. As shown in FIG. 4, shift lever 101, P position switch 102 and power switch 103 are positioned such that they can be readily operated by the driver. Functions of shift lever 101, P position switch 102 and power switch 103 will be described later.

An operation portion 71 is an operation portion (for example, a cursor key and an enter button) of meter panel 61. In this embodiment, operation portion 71 is provided on steering wheel 104. In this embodiment, meter panel 61 displays various measuring instruments (for example, a speed meter) of vehicle 100, and a malfunction indicator lamp (MIL). Meter panel 61 may further display a state of vehicle 100 (for example, the SOC of main battery 11) estimated using detection values from the various sensors.

A display 62 (for example, a touch panel display) and an operation portion 72 (for example, a cursor key and an enter button) of a navigation system are further provided in the vicinity of the driver's seat in vehicle 100. The navigation system has a speaker function, and can provide a notification to the user not only by representation on display 62 but also by sound (including voice). Although not shown, a main body of the navigation system is arranged in an instrument panel.

An operation portion 73 is an operation portion of head up display 63. In this embodiment, operation portion 73 is provided in the vicinity of steering wheel 104. The user can operate operation portion 73 to switch a representation on head up display 63, or power on and off head up display 63.

Meter panel 61, display 62 of the navigation system, and head up display 63 described above are included in notification device 60 shown in FIG. 2. Operation portions 71 to 73 described above are included in input device 70 shown in FIG. 2. Note that notification device 60 and input device 70 may be any devices, without being limited to the example shown in FIG. 4. Notification device 60 and input device 70 may be mounted on a mobile device such as a tablet terminal, a smartphone, a wearable device, an electronic key, or a service tool (that is, an electronic device that can be carried by the user). A mobile device capable of communicating with HVECU 50 can function as notification device 60 and input device 70. Input device 70 may also include a smart speaker that accepts an audio input.

Referring back to FIG. 2, each of shift lever 101 and P position switch 102 can switch between a plurality of shift ranges in response to shifting operation by the user. The user can move shift lever 101 to a prescribed position (see FIG. 2) to select one of an N (neutral) range, an R (reverse) range, a D (drive) range and a B (brake) range. The user can also stop vehicle 100 and press P position switch 102 to select a P (parking) range. HVECU 50 switches the shift range of vehicle 100 to a range selected by the user. In this embodiment, each of shift lever 101 and P position switch 102 corresponds to an exemplary "shift device" according to the present disclosure. Note that the shift change can be made in any manner, without being limited to the manner using a lever and the manner using a push button described above.

HVECU 50 controls vehicle 100 in accordance with the shift range. When the shift range is the N range, for example, HVECU 50 brings transmission mechanism 421 into the above-described neutral state (that is, a state where the transmission of motive power is cut off). When the shift range of vehicle 100 is the N range, the above-described engine electric power generation is not performed. When the shift range is a non-neutral range (that is, a range other than the N range), HVECU 50 brings transmission mechanism 421 into the above-described non-neutral state (that is, a state where motive power is transmitted). When the shift range is the B range, HVECU 50 makes it easier to apply an engine brake during travel of vehicle 100 than when the shift range is the D range. The D range and the B range correspond to travel ranges. When the shift range is the P range, the ring gear of planetary gear 431 is locked by a parking device (not shown) that mechanically blocks the rotation of the ring gear of planetary gear 431.

Power switch 103 is a start-up switch for starting up a vehicle system. In general, the start-up switch is referred to as a "power switch" or an "ignition switch." As will be described below, the user can operate power switch 103 to switch between an active state (Ready-ON state) and a stopped state (Ready-OFF state) of the vehicle system.

Power switch 103 is operated when, for example, the operation of vehicle 100 is to be started or ended. In the stopped state (Ready-OFF state) of the vehicle system, when power switch 103 is pressed with a brake pedal (not shown) being depressed, the vehicle system (and, in turn, HVECU 50) is started up and brought into the Ready-ON state. In the Ready-ON state, HVECU 50 closes SMR 14 to supply electric power from main battery 11 to PCU 24, to allow travel of vehicle 100.

In the active state (Ready-ON state) of the vehicle system, the user can stop vehicle 100, set the shift range to the P range, and then press power switch 103, to bring the vehicle system into the Ready-OFF state. During the switching from the Ready-ON state to the Ready-OFF state of the vehicle system, HVECU 50 opens SMR 14 to disconnect the current path of main battery 11. In the Ready-OFF state, HVECU 50 is in a stopped state (including a sleep state).

Vehicle 100 further includes a DC/DC converter 81 and an auxiliary battery 82. DC/DC converter 81 cuts off or transforms (for example, steps down) DC power supplied from main battery 11 to auxiliary battery 82. Auxiliary battery 82 is a vehicle-mounted battery of a low voltage system (for example, a 12 V system) and supplies electric power to an auxiliary device mounted on vehicle 100. The auxiliary device is a load that consumes electric power in vehicle 100 for purposes other than electrically powered traveling. For example, notification device 60 and each of computers for control (for example, battery ECU 13, motor ECU 23, engine ECU 33 and HVECU 50) correspond to the auxiliary device. The above-described navigation system is also included in the auxiliary device. The auxiliary device mounted on vehicle 100 is driven by driving power (for example, electric power having a voltage of approximately 5 V to 12 V) generated using electric power of auxiliary battery 82. A lead battery can be adopted, for example, as auxiliary battery 82. However, a secondary battery (for example, a nickel-metal hydride battery) other than the lead battery may be adopted as auxiliary battery 82. Although not shown, auxiliary battery 82 is provided with various sensors that detect a state (for example, a temperature, a current and a voltage) of auxiliary battery 82. HVECU 50 can obtain a state (for example, a temperature, a current, a voltage, and an SOC) of auxiliary battery 82 based on the outputs from these sensors.

When SMR 14 is closed (connected), electric power can be supplied and received between main battery 11 and DC/DC converter 81. For example, when the SOC of auxiliary battery 82 falls below a prescribed value, HVECU 50 closes SMR 14 and controls DC/DC converter 81, to charge auxiliary battery 82 with electric power of main battery 11. When a decrease in the SOC of auxiliary battery 82 is predicted from an amount of driving of the auxiliary device, too, HVECU 50 charges auxiliary battery 82 with electric power of main battery 11 in a manner similar to the above.

Vehicle 100 further includes communication equipment 90. Communication equipment 90 includes various communication interfaces (I/Fs). Communication equipment 90 may include a data communication module (DCM). HVECU 50 wirelessly communicates with a communication device outside the vehicle through communication equipment 90.

In this embodiment, a microcomputer is adopted as each of battery ECU 13, motor ECU 23, engine ECU 33 and HVECU 50. Each of battery ECU 13, motor ECU 23, engine ECU 33 and HVECU 50 includes a processor, a random access memory (RAM), a storage, and a communication I/F. For example, a central processing unit (CPU) can be adopted as each processor. Each communication OF includes a controller area network (CAN) controller. Each ECU can conduct CAN communication among the ECUs. The RAM functions as a work memory that temporarily stores data to be processed by the processor. The storage can store information that is put thereinto. Each storage includes, for example, a read only memory (ROM) and a rewritable non-volatile memory. Each storage stores not only a program but also information (for example, a map, a mathematical expression, and various parameters) to be used by a program. As a program stored in each storage is executed by the processor, various types of control in vehicle 100 are performed. Without being limited as such, the various types of control may be performed by dedicated hardware (electronic circuitry). Any number of processors may be provided in each ECU and any one of the ECUs may include a plurality of processors.

When the SOC of main battery 11 decreases excessively, deterioration of main battery 11 is accelerated. In this embodiment, when the SOC of main battery 11 becomes equal to or lower than a prescribed value (which is hereinafter denoted as a "threshold value X1"), deterioration of main battery 11 may be accelerated. Therefore, HVECU 50 performs the above-described E-charging control (that is, control of charging main battery 11 with electric power generated by the engine electric power generation), so as to prevent an excessive decrease in the SOC of main battery 11. When the SOC of main battery 11 becomes equal to or lower than threshold value X1, HVECU 50 finds that an abnormality has occurred in at least one of engine 31 and MG 21a, and records E-diagnostic information (that is, diagnosis information indicating the occurrence of an abnormality in at least one of engine 31 and MG 21a) in a storage (more specifically, a storage 50a which will be described later).

When the shift range of vehicle 100 is the N range, however, the engine electric power generation is not performed. When vehicle 100 is left in the N range, therefore, the SOC of main battery 11 may decrease and fall below threshold value X1. For example, when the SOC of auxiliary battery 82 decreases due to power consumption by the auxiliary device, electric power is supplied form main battery 11 to auxiliary battery 82, causing a decrease in the SOC of main battery 11. In such a case, the SOC of main battery 11 becomes equal to or lower than threshold value X1 despite the absence of abnormalities in engine 31 and MG 21a, resulting in the E-diagnostic information being erroneously recorded.

Figure 5:
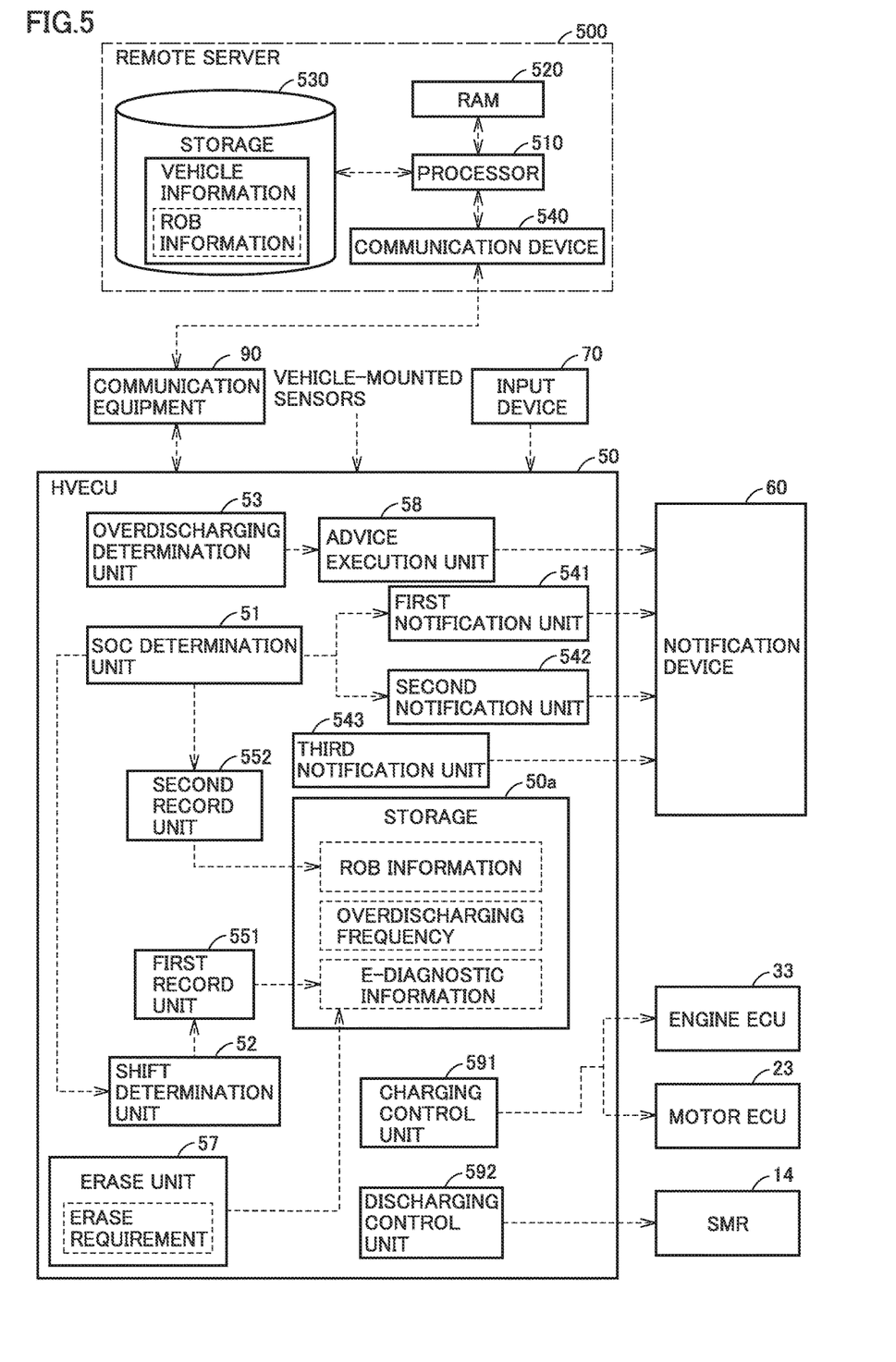
FIG. 5 shows a detailed configuration of the vehicle management system according to the embodiment of the present disclosure.

Thus, HVECU 50 according to this embodiment suppresses the erroneous recording of the E-diagnostic information by having a configuration described below. FIG. 5 shows a detailed configuration of HVECU 50 and remote server 500 (FIG. 1).

Referring to FIG. 5 together with FIG. 1, remote server 500 includes a processor 510, a RAM 520, a storage 530, and a communication device 540. Communication device 540 wirelessly communicates with communication equipment 90 mounted on vehicle 100. Remote server 500 collects and manages information on each vehicle (which is hereinafter also referred to as "vehicle information") registered in remote server 500. The vehicle information is stored in storage 530. A vehicle ID (identification information for identifying each vehicle) is assigned to each vehicle registered in remote server 500. Remote server 500 manages the vehicle information as being distinguished based on the vehicle ID. The vehicle ID may be a vehicle identification number (VIN).

Vehicle 100 sequentially transmits information on vehicle 100 obtained by the vehicle-mounted sensors (for example, a position, a state of engine 31, a state of main battery 11, a vehicle speed, and a travel distance), various determination results (for example, ROB information which will be described later), and the vehicle ID to remote server 500. Remote server 500 uses the information transmitted from each vehicle registered in remote server 500, to update the vehicle information in storage 530. The information on each vehicle collected by remote server 500 is used, for example, for management and development of vehicles, and for services to users.

HVECU 50 includes an SOC determination unit 51, a shift determination unit 52, an overdischarging determination unit 53, a first notification unit 541, a second notification unit 542, a third notification unit 543, a first record unit 551, a second record unit 552, an erase unit 57, an advice execution unit 58, a charging control unit 591, and a discharging control unit 592. In this embodiment, each component above is implemented by the processor of HVECU 50 and a program executed by the processor. Without being limited as such, each component above may be implemented by dedicated hardware (electronic circuitry). HVECU 50 according to this embodiment corresponds to an exemplary "controller for a hybrid vehicle" according to the present disclosure.

SOC determination unit 51 determines whether or not the SOC of main battery 11 is equal to or lower than a prescribed threshold value. The SOC of main battery 11 is hereinafter also referred to as a "main SOC." In this embodiment, above-described threshold value X1 is adopted as the threshold value in SOC determination unit 51. Threshold values X2 and X3 higher than threshold value X1 are also adopted as threshold values in SOC determination unit 51. Threshold values X1 to X3 have a relation of "threshold value X3>threshold value X2>threshold value X1."

Shift determination unit 52 determines whether the shift range of vehicle 100 is a first range or a second range. Charging control unit 591 performs the E-charging control when the shift range of vehicle 100 is the first range and the main SOC becomes equal to or lower than above-described threshold value X3, and does not perform the E-charging control when the shift range of vehicle 100 is the second range. The first range is a shift range where the engine electric power generation is performed. In this embodiment, a non-neutral range (that is, a range other than the N range) is the first range. The second range is a shift range where the engine electric power generation is not performed. In this embodiment, the neutral range (N range) is the second range. The user can set the shift range to the P range while vehicle 100 is stopped, for example, to perform the engine electric power generation so as to prevent an excessive decrease in the main SOC.

Figure 6:
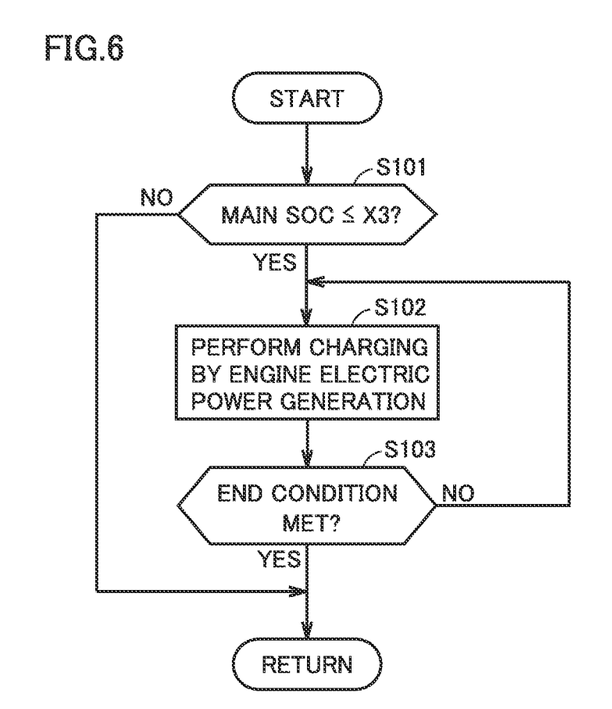
FIG. 6 is a flowchart showing E-charging control according to the embodiment of the present disclosure.

FIG. 6 is a flowchart showing the E-charging control according to this embodiment. Processing shown in this flowchart is invoked from a main routine (not shown) and repeatedly performed each time a prescribed time period elapses when, for example, the vehicle system is in the Ready-ON state, and when the shift range of vehicle 100 is the first range.

Referring to FIG. 6, in a step (which is hereinafter simply denoted as "S") 101, SOC determination unit 51 determines whether or not the main SOC is equal to or lower than threshold value X3. When determination as NO (the main SOC being higher than threshold value X3) is made in S101, the processing is returned to the main routine. When determination as YES (the main SOC being equal to or lower than threshold value X3) is made in S101, on the other hand, in S102, charging control unit 591 performs the engine electric power generation by MG 21a while making a torque adjustment by MG 21b, by controlling engine 31 and MGs 21a, 21b through engine ECU 33 and motor ECU 23. Electric power generated by the engine electric power generation is supplied to main battery 11. As main battery 11 is then charged, the main SOC increases.

In S103, charging control unit 591 determines whether or not a prescribed end condition is met. The end condition may be met when the SOC of main battery 11 becomes equal to or higher than a prescribed value higher than threshold value X3. Alternatively, the end condition may be met when a time period of execution of the engine electric power generation (that is, a time period that has elapsed since the start of the engine electric power generation) exceeds a prescribed time period. Without being limited as above, any end condition may be set.

During a period when determination as NO (the end condition not being met) is made in S103, S102 and S103 are repeatedly performed, and the engine electric power generation and the charging of main battery 11 in S102 is thus continuously performed. When determination as YES (the end condition being met) is made in S103, on the other hand, the processing is returned to the main routine.

Referring back to FIG. 5 together with FIG. 1, HVECU 50 includes storage 50a. First record unit 551 records the above-described E-diagnostic information in storage 50a when the main SOC is equal to or lower than threshold value X1 and the shift range of vehicle 100 is the first range, and does not record the E-diagnostic information when the main SOC is equal to or lower than threshold value X1 and the shift range of vehicle 100 is the second range. The recording of the E-diagnostic information in storage 50a is hereinafter also referred to as "diagnosis recording." Erase unit 57 erases the recorded E-diagnostic information when a prescribed erase requirement indicating normal operation of engine 31 and MG 21a is met after the E-diagnostic information is recorded by first record unit 551.

In this embodiment, the E-diagnostic information corresponds to a diagnostic trouble code (DTC) to be used in on-board diagnostics (OBD). When recording the DTC, first record unit 551 may also record freeze frame data (FFD) in storage 50a. The FFD is information indicating the conditions of vehicle 100 (for example, detection values from the vehicle-mounted sensors) upon detection of an abnormality. Erase unit 57 finds that the erase requirement is met when all of requirements (A) to (D) indicated below are met during a single Ready-ON period (that is, a period from the time when the vehicle system enters the Ready-ON state to the time when the vehicle system enters the Ready-OFF state), and erases the E-diagnostic information (that is, the DTC) in storage 50a. The erasing of the E-diagnostic information in storage 50a is hereinafter also referred to as "diagnosis erasing."

(A) A prescribed time period (for example, ten minutes) has elapsed since the start of engine 31.

(B) A cumulative time period of travel at equal to or higher than a prescribed speed (for example, 40 km per hour) is equal to or longer than a prescribed time period (for example, five minutes).

(C) Engine 31 has continuously maintained an idle state for equal to or longer than a prescribed time period (for example, ten minutes).

(D) A failure diagnosis of a detection object (including MG 21a) determined that the object was normal.

Meeting the erase requirement (that is, meeting all of the requirements (A) to (D) during a single Ready-ON period) means that engine 31 and MG 21a operate normally. Once the E-diagnostic information is recorded, the user cannot erase the E-diagnostic information unless the erase requirement is met.

Second record unit 552 records record of behavior (ROB) information indicating a decrease in the SOC of main battery 11 when the main SOC becomes equal to or lower than threshold value X1. In this embodiment, the ROB information corresponds to exemplary "history information" according to the present disclosure. In addition, that the main SOC becomes equal to or lower than threshold value X1 corresponds to a "first SOC decrease." Second record unit 552 records timing (time of occurrence) of the first SOC decrease as the ROB information in storage 50a. The recording of the ROB information in storage 50a is hereinafter also referred to as "ROB recording."

From the ROB information, HVECU 50 can determine a frequency of occurrence (that is, the number of occurrences per unit time) of the first SOC decrease. In this embodiment, HVECU 50 determines the number of occurrences of the first SOC decrease during the last prescribed period (for example, the last one week), and stores an overdischarging frequency in storage 50a. The number of occurrences of the first SOC decrease during the last prescribed period is hereinafter also referred to as "overdischarging frequency." The overdischarging frequency is sequentially updated in real time. Overdischarging determination unit 53 determines whether or not the overdischarging frequency in storage 50a exceeds a prescribed frequency (which is hereinafter denoted as a "threshold value Y").

When the overdischarging frequency exceeds threshold value Y, HVECU 50 causes a transition to occur to an advice mode in which advice for preventing the occurrence of the first SOC decrease (that is, advice for lowering the overdischarging frequency) is given to the user. When the transition is made from a non-advice mode (normal mode) to the advice mode, advice execution unit 58 is started up and performs processing involved with the advice mode. In the advice mode according to this embodiment, advice execution unit 58 communicates with remote server 500 outside the vehicle and delivers advice via the remote service to the user. Details of the advice mode will be described later (see FIG. 10).

Discharging control unit 592 stops discharging of main battery 11 by disconnecting the current path of main battery 11 when the main SOC becomes equal to or lower than threshold value X1. In this embodiment, when the main SOC becomes equal to or lower than threshold value X1, discharging control unit 592 opens SMR 14, and then HVECU 50 enters a stopped state (for example, a sleep state). The vehicle system thus enters the Ready-OFF state.

First notification unit 541 provides a first notification to the user when the main SOC becomes equal to or lower than threshold value X1. Second notification unit 542 provides a second notification to the user when the main SOC becomes equal to or lower than threshold value X2. Third notification unit 543 provides a third notification to the user during a period from the recording of the E-diagnostic information by first record unit 551 to the erasing of the E-diagnostic information. Content of each notification will be described later.

Figure 7:
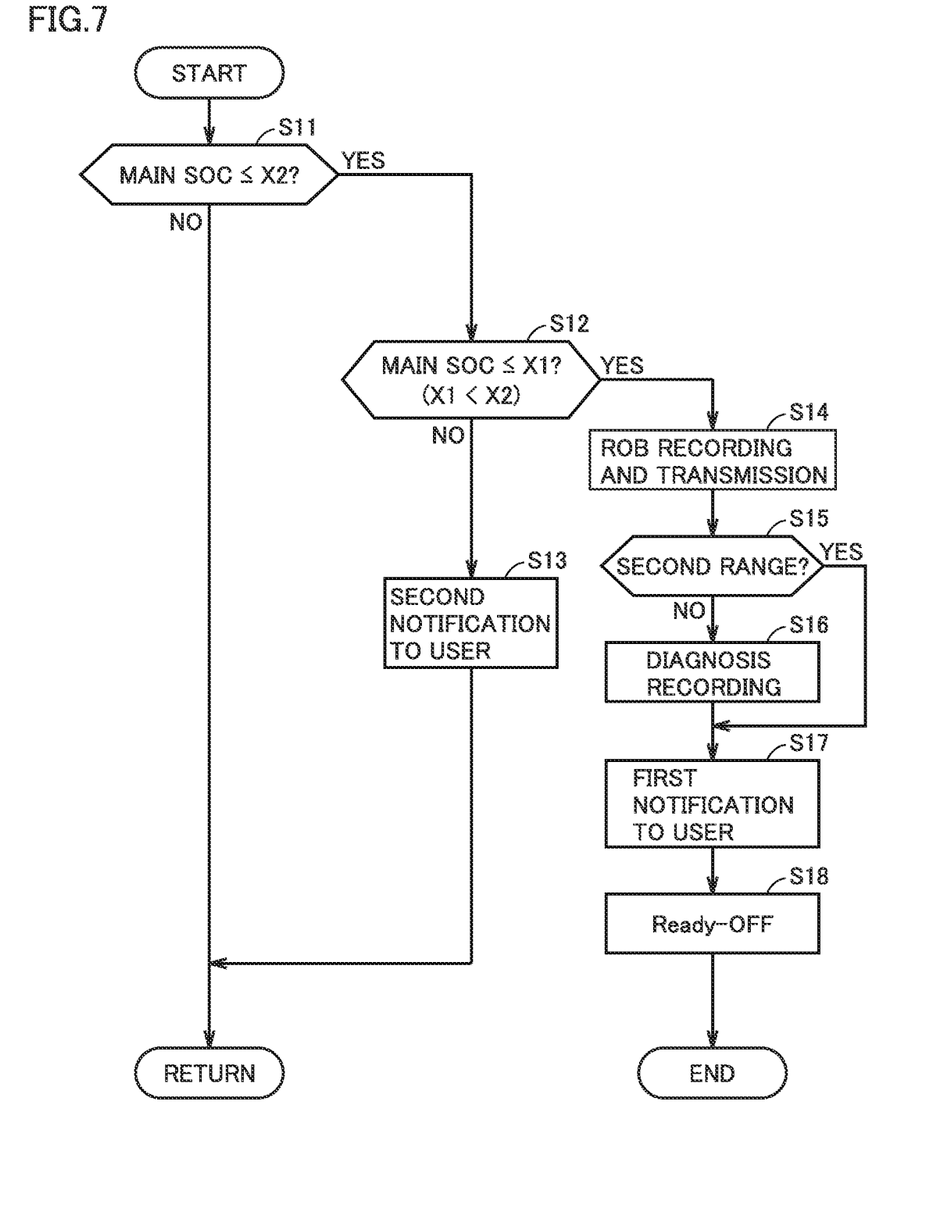
FIG. 7 is a flowchart showing a procedure of a method for diagnosing an abnormality in the hybrid vehicle according to the embodiment of the present disclosure.

FIG. 7 is a flowchart showing a procedure of a method for diagnosing an abnormality in the hybrid vehicle performed by HVECU 50. Processing shown in this flowchart is invoked from the main routine (not shown) and repeatedly performed each time a prescribed time period elapses when, for example, the vehicle system is in the Ready-ON state.

Referring to FIG. 7 together with FIG. 5, in S11, SOC determination unit 51 determines whether or not the main SOC is equal to or lower than threshold value X2. When determination as NO (the main SOC being higher than threshold value X2) is made in S11, the processing is returned to the main routine. When determination as YES (the main SOC being equal to or lower than threshold value X2) is made in S11, on the other hand, in S12, SOC determination unit 51 determines whether or not the main SOC is equal to or lower than threshold value X1. In this embodiment, that the main SOC becomes equal to or lower than threshold value X2 corresponds to a "second SOC decrease."

When determination as NO (the main SOC being higher than threshold value X1 and being equal to or lower than threshold value X2) is made in S12, second notification unit 542 provides the second notification to the user in S13, and the processing is then returned to the main routine. Second notification unit 542 provides the second notification by controlling notification device 60. Any content of the second notification can be set. In this embodiment, a message such as "The battery is running low. Pleas set the P range" is displayed by the second notification. This message may be displayed on any of meter panel 61, display 62 of the navigation system, and head up display 63 shown in FIG. 4. The message may be displayed on a mobile device carried by the user.

When the second SOC decrease occurs due to the shift range being set to the N range, the user sets the shift range to the P range in response to the message, to increase the SOC of main battery 11. More specifically, when the shift range is switched from the N range to the P range, the engine electric power generation and the charging of main battery 11 (S102) is performed in the E-charging control shown in FIG. 6, and the SOC of main battery 11 becomes higher than threshold value X3. When an abnormality has occurred in at least one of engine 31 and MG 21a, however, the engine electric power generation is not performed. It is thus believed that the SOC of main battery 11 decreases as time elapses.

In this embodiment, during a period when the main SOC is higher than threshold value X1 and is equal to or lower than threshold value X2, the second notification is continuously provided in S13. Without being limited as such, the second notification may be provided only at timing when the main SOC higher than threshold value X2 decreases to a level equal to or lower than threshold value X2. For example, when the main SOC becomes equal to or lower than threshold value X2, a message such as "The battery is running low. Pleas set the P range" may be given to the user by voice.

When determination as YES (the main SOC being equal to or lower than threshold value X1) is made in S12, second record unit 552 performs the ROB recording in S14. In addition, the ROB information (that is, information indicating the occurrence of the first SOC decrease at the time of the determination as YES in S12) recorded in storage 50a is transmitted from HVECU 50 to remote server 500 through communication equipment 90. The processing then proceeds to S15.

In S15, shift determination unit 52 determines whether or not the shift range of vehicle 100 is the second range (the neutral range in this embodiment). When determination as NO (the shift range being the first range) is made in S15, first record unit 551 performs the diagnosis recording in S16, and the processing then proceeds to S17. Through the processing in S16, E-diagnostic information (that is, a DTC indicating the occurrence of an abnormality in at least one of engine 31 and MG 21a) is recorded in storage 50a. When determination as YES (the shift range being the second range) is made in S15, on the other hand, the processing proceeds to S17 without the processing in S16 being performed. In this case, the diagnosis recording is not performed.

In S17, first notification unit 541 provides the first notification to the user by controlling notification device 60. Any content of the first notification can be set. In this embodiment, a message such as "As the battery is running low, the system is stopped. Please set the P range and restart" is displayed by the first notification. This message may be displayed on any of meter panel 61, display 62 of the navigation system, and head up display 63 shown in FIG. 4. The message may be displayed on a mobile device carried by the user. Notification device 60 may give the message to the user by voice.

After the processing in S17, the vehicle system enters the Ready-OFF state in S18. More specifically, after discharging control unit 592 opens SMR 14, HVECU 50 enters a sleep state. Then, as processing in S18 is performed, a series of processing shown in FIG. 7 ends.

Figure 8:
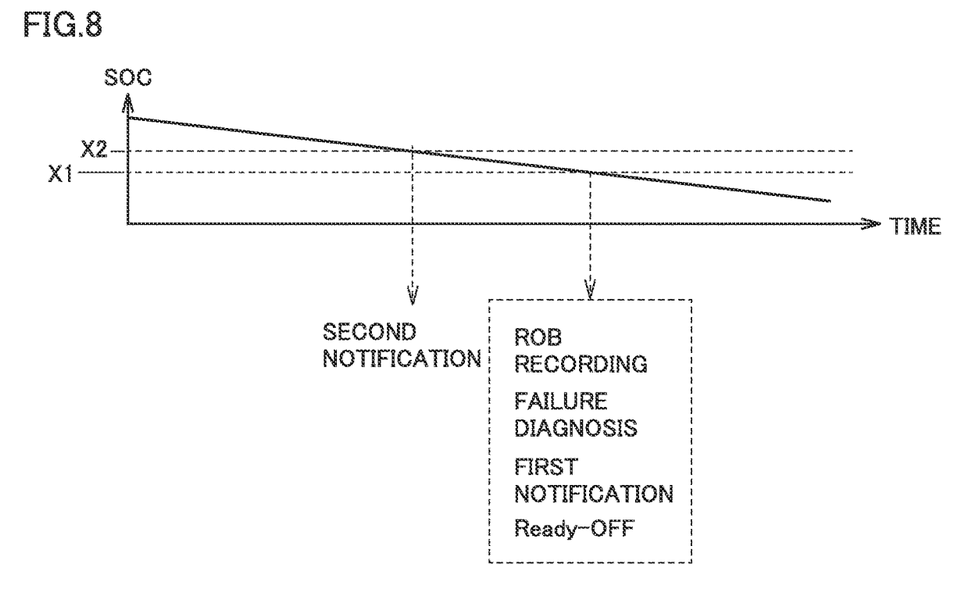
FIG. 8 shows an overview of processing shown in FIG. 7.

FIG. 8 shows an overview of the processing shown in FIG. 7. Referring to FIG. 8 together with FIG. 7, when the main SOC decreases to a level equal to or lower than threshold value X2 (YES in S11 and NO in S12), the second notification is provided (S13). When the main SOC further decreases to a level equal to or lower than threshold value X1 (YES in S12), the ROB recording (S14), the failure diagnosis (S15), the first notification (S17), and the Ready-OFF state (S18) are performed. When it is determined in the failure diagnosis that an abnormality has occurred in at least one of engine 31 and MG 21a (NO in S15), the diagnosis recording (S16) is performed.

As described above, HVECU 50 according to this embodiment includes first record unit 551. First record unit 551 records the E-diagnostic information (S16 in FIG. 7) when the main SOC is equal to or lower than threshold value X1 (YES in S12 in FIG. 7) and the shift range is the first range (a non-neutral range in this embodiment) (NO in S15 in FIG. 7), and does not record the E-diagnostic information when the main SOC is equal to or lower than threshold value X1 (YES in S12 in FIG. 7) and the shift range is the second range (the neutral range in this embodiment) (YES in S15 in FIG. 7). Therefore, even if vehicle 100 is left in the neutral range where the engine electric power generation is not performed, the possibility of the E-diagnostic information being erroneously recorded is low. In this manner, according to HVECU 50, the erroneous recording of the E-diagnostic information can be suppressed.

According to the processing shown in FIG. 7, even if the main SOC becomes equal to or lower than threshold value X1 due to an inspector waiting in the neutral range during an inspection of delivery of vehicle 100, for example, determination as YES is made in S15, and thus the diagnosis recording (S16) is not performed. This can eliminate the need for the inspector to perform the travel for meeting the above-described erasing condition (see the above-described requirement (B)) before vehicle delivery. An increase in distance measured by the odometer before vehicle delivery can be avoided.

HVECU 50 also includes discharging control unit 592. When the main SOC becomes equal to or lower than threshold value X1 (YES in S12 in FIG. 7), discharging of main battery 11 is forcibly stopped by discharging control unit 592 (S18 in FIG. 7). Therefore, even if the user has poor driving skills, an excessive decrease in the SOC of main battery 11 is suppressed.

Figure 9:
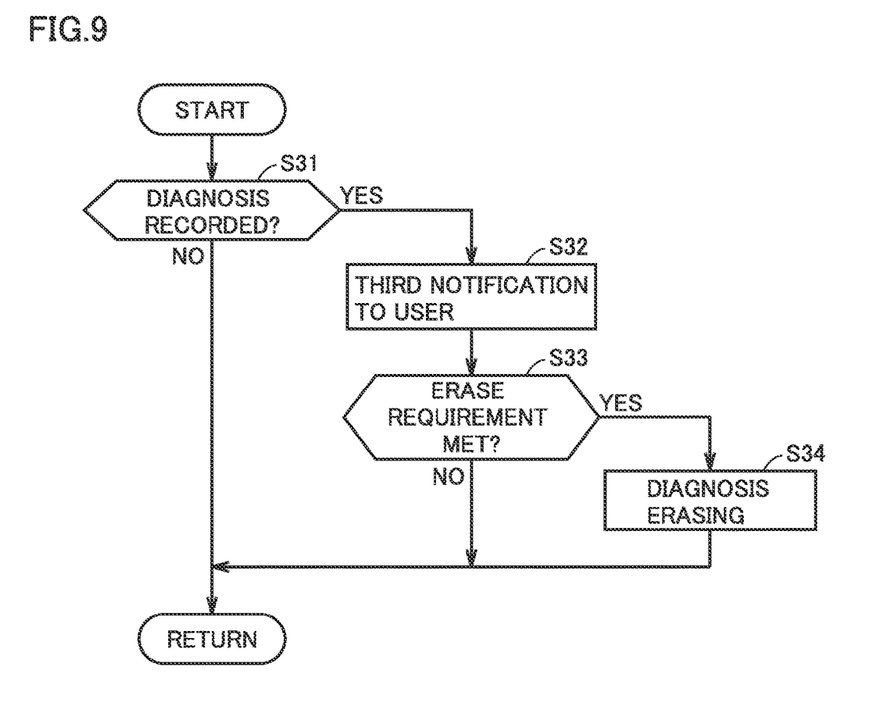
FIG. 9 is a flowchart showing processing involved with the on-board diagnostics (OBD) function of a controller for the hybrid vehicle according to the embodiment of the present disclosure.

FIG. 9 is a flowchart showing processing involved with the on-board diagnostics (OBD) function of HVECU 50. The processing shown in this flowchart is invoked from the main routine (not shown) and repeatedly performed each time a prescribed time period elapses, for example.

Referring to FIG. 9 together with FIG. 5, in S31, third notification unit 543 determines whether or not E-diagnostic information (that is, a DTC indicating the occurrence of an abnormality in at least one of engine 31 and MG 21a) has been recorded in storage 50a. When determination as NO (the E-diagnostic information not having been recorded) is made in S31, the processing is returned to the main routine. When determination as YES (the E-diagnostic information having been recorded) is made in S31, on the other hand, in S32, third notification unit 543 provides the third notification to the user by controlling notification device 60. The third notification is processing of notifying the user of the occurrence of an abnormality in vehicle 100. Any content of the third notification can be set. In this embodiment, the malfunction indicator lamp (MIL) displayed on meter panel 61 is illuminated by the third notification. In this embodiment, the illumination of the MIL is continued during the abnormality period (that is, a period from the recording of the E-diagnostic information by first record unit 551 to the erasing of the E-diagnostic information). The location where the MIL is arranged in vehicle 100 is not limited to meter panel 61 and any location may be employed.

After the processing in S32, the processing proceeds to S33. In S33, erase unit 57 determines whether or not the above-described erase requirement is met. When determination as YES (the erase requirement being met) is made in S33, erase unit 57 performs the diagnosis erasing in S34. The E-diagnostic information (that is, the DTC) in storage 50a is thus erased. Then, the processing is returned to the main routine. When determination as YES (the erase requirement not being met) is made in S33, the processing is returned to the main routine without the diagnosis erasing being performed.

As described above, HVECU 50 according to this embodiment includes third notification unit 543. Third notification unit 543 provides the third notification. The user can recognize that an abnormality has occurred in vehicle 100 by the third notification, and request repair workers to repair vehicle 100.

HVECU 50 also includes erase unit 57. When the prescribed erase requirement is met, the E-diagnostic information is erased by erase unit 57. Therefore, when the E-diagnostic information is erroneously recorded, the user can erase the E-diagnostic information by meeting the prescribed erase requirement.

Figure 10:
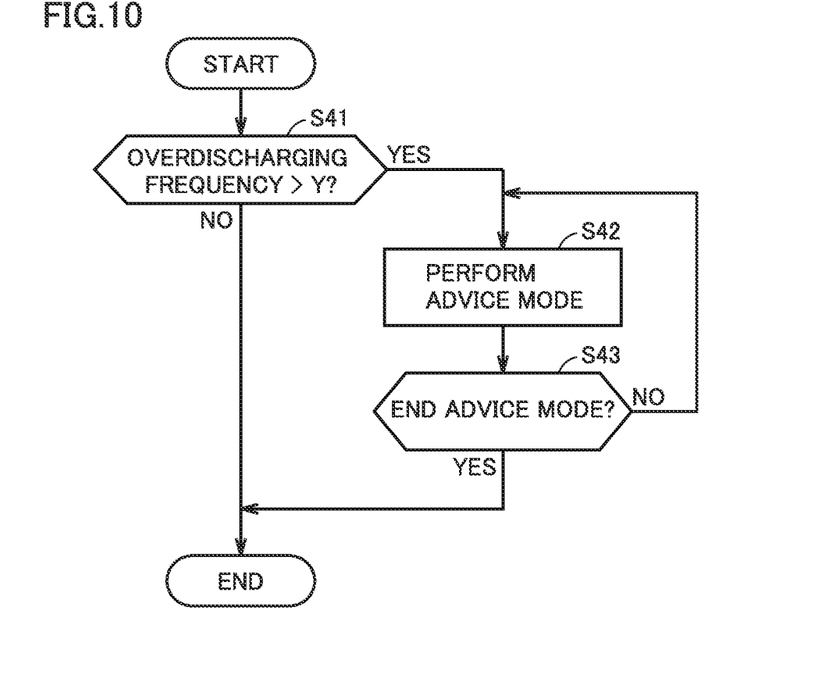
FIG. 10 is a flowchart showing advice mode transition control performed by the controller for the hybrid vehicle according to the embodiment of the present disclosure.

FIG. 10 is a flowchart showing advice mode transition control performed by HVECU 50. Processing shown in this flowchart is started when a prescribed execution condition is met in the Ready-ON state of the vehicle system. This execution condition may be met when, for example, the main SOC becomes equal to or lower than threshold value X2.

Referring to FIG. 10 together with FIGS. 1 and 5, in S41, overdischarging determination unit 53 determines whether or not the overdischarging frequency in storage 50a exceeds threshold value Y. When determination as NO (the overdischarging frequency being equal to or lower than threshold value Y) is made in S41, a series of processing shown in FIG. 10 ends. When determination as YES (the overdischarging frequency exceeding threshold value Y) is made in S41, on the other hand, HVECU 50 proceeds the processing to S42. A transition is thus made from the non-advice mode (normal mode) to the advice mode.

In S42, advice execution unit 58 performs processing involved with the advice mode. Advice execution unit 58 communicates with remote server 500 shown in FIG. 1 and requests remote service from remote server 500. In response to the request from advice execution unit 58, remote server 500 connects a communication line with vehicle 100 to one of the remote service terminals. This allows a conversation between the user of vehicle 100 and an operator of the remote service terminal. That is, this allows the user of vehicle 100 to receive advice for avoiding the first SOC decrease (for example, advice about timing to switch between the first range and the second range) from the operator of the remote service terminal. The use of the remote service allows providing advice with flexibility depending on the user.

In S43, advice execution unit 58 determines whether or not a prescribed end condition is met. The end condition may be met when HVECU 50 receives an end request from the user, or when a prescribed time period has elapsed since the transition to the advice mode. Without being limited as above, any end condition may be set.

During a period when determination as NO (the end condition not being met) is made in S43, S42 and S43 are repeatedly performed to continue the advice mode. In S42, advice execution unit 58 communicates with remote server 500 and delivers advice via the remote service to the user. When determination as YES (the end condition being met) is made in S43, on the other hand, a series of processing shown in FIG. 10 ends.

As described above, HVECU 50 according to this embodiment causes a transition to the advice mode to occur when the overdischarging frequency exceeds threshold value Y (YES in S41 in FIG. 10). Therefore, when the first SOC decrease occurs frequently due to the user's poor driving skills, the user can receive advice in the advice mode. This facilitates lowering of the overdischarging frequency.

Although the remote service is used in the advice mode according to the embodiment, the use of the remote service in the advice mode is not essential. In the advice mode, for example, the navigation system mounted on the hybrid vehicle may give advice to the user in accordance with a prescribed program.

The configuration of the hybrid vehicle is not limited to the configuration shown in FIGS. 1 to 4. The hybrid vehicle may be a plug-in hybrid vehicle (PHV) in which a power storage device (for example, main battery 11) can be charged with electric power supplied from outside the vehicle. The hybrid vehicle is not limited to a passenger vehicle, and may be a bus or a truck. The hybrid vehicle may be able to travel without an occupant on board by automated driving or remote driving. The hybrid vehicle may be an automated guided vehicle (AGV).

Although an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A controller for a hybrid vehicle, the hybrid vehicle comprising:
   an engine;
   a generator that is driven by the engine;
   a power storage device chargeable with electric power generated by the generator; and
   a shift device capable of switching between a plurality of shift ranges in response to shifting operation by a user, the plurality of shift ranges including a first range and a second range, and
   the controller including
      a charging control unit that performs charging control when a shift range of the hybrid vehicle is the first range, and does not perform the charging control when the shift range of the hybrid vehicle is the second range, the charging control being control of charging the power storage device with electric power generated by the generator driven by the engine, and
      a first record unit that records diagnosis information when an SOC of the power storage device is equal to or lower than a first threshold value and the shift range of the hybrid vehicle is the first range, and does not record the diagnosis information when the SOC of the power storage device is equal to or lower than the first threshold value and the shift range of the hybrid vehicle is the second range, the diagnosis information indicating occurrence of an abnormality in at least one of the engine and the generator.

2. The controller for a hybrid vehicle according to claim 1, wherein
the first range includes a parking range, and the second range includes a neutral range.

3. The controller for a hybrid vehicle according to claim 1, further including a second record unit that records history information indicating a decrease in the SOC of the power storage device when the SOC of the power storage device becomes equal to or lower than the first threshold value.

4. The controller for a hybrid vehicle according to claim 1, further including a discharging control unit that stops discharging of the power storage device by disconnecting a current path of the power storage device when the SOC of the power storage device becomes equal to or lower than the first threshold value.

5. The controller for a hybrid vehicle according to claim 1, further including:
- a second record unit that records history information indicating a decrease in the SOC of the power storage device when the SOC of the power storage device becomes equal to or lower than the first threshold value; and
- a discharging control unit that stops discharging of the power storage device by disconnecting a current path of the power storage device when the SOC of the power storage device becomes equal to or lower than the first threshold value, wherein
when a frequency with which the SOC of the power storage device becomes equal to or lower than the first threshold value, indicated by the history information, exceeds a prescribed frequency, the controller makes a transition to an advice mode in which advice for preventing the SOC of the power storage device from becoming equal to or lower than the first threshold value is given to the user.

6. The controller for a hybrid vehicle according to claim 5, wherein
in the advice mode, the controller communicates with outside and delivers advice via remote service to the user.

7. The controller for a hybrid vehicle according to claim 1, further including a first notification unit that provides a notification to the user when the SOC of the power storage device becomes equal to or lower than the first threshold value.

8. The controller for a hybrid vehicle according to claim 1, further including a second notification unit that provides a notification to the user when the SOC of the power storage device becomes equal to or lower than a second threshold value higher than the first threshold value.

9. The controller for a hybrid vehicle according to claim 1, further including a third notification unit that notifies, during a period from recording of the diagnosis information by the first record unit to erasing of the diagnosis information, the user of occurrence of an abnormality in the hybrid vehicle.

10. The controller for a hybrid vehicle according to claim 1, further including an erase unit that erases the recorded diagnosis information when a prescribed erase requirement is met after the diagnosis information is recorded by the first record unit, the prescribed erase requirement indicating normal operation of the engine and the generator.

* * * * *